United States Patent
Nachum et al.

(10) Patent No.: US 11,429,844 B2
(45) Date of Patent: Aug. 30, 2022

(54) TRAINING POLICY NEURAL NETWORKS USING PATH CONSISTENCY LEARNING

(71) Applicant: Google LLC, Mountain View, CA (US)

(72) Inventors: Ofir Nachum, Palo Alto, CA (US); Mohammad Norouzi, Richmond Hill (CA); Dale Eric Schuurmans, Mountain View, CA (US); Kelvin Xu, Berkeley, CA (US)

(73) Assignee: Google LLC, Mountain View, CA (US)

( * ) Notice: Subject to any disclaimer, the term of this patent is extended or adjusted under 35 U.S.C. 154(b) by 275 days.

(21) Appl. No.: 16/904,785

(22) Filed: Jun. 18, 2020

(65) Prior Publication Data

US 2020/0320372 A1  Oct. 8, 2020

Related U.S. Application Data

(63) Continuation of application No. 16/504,934, filed on Jul. 8, 2019, now Pat. No. 10,733,502, which is a continuation of application No. PCT/US2018/019416, filed on Feb. 23, 2018.

(60) Provisional application No. 62/463,562, filed on Feb. 24, 2017.

(51) Int. Cl.
*G06N 3/04* (2006.01)
*G06N 3/08* (2006.01)

(52) U.S. Cl.
CPC ............ *G06N 3/0454* (2013.01); *G06N 3/08* (2013.01)

(58) Field of Classification Search
CPC ......... G06N 3/0454; G06N 3/08; G06N 3/006

USPC .......................................................... 706/20
See application file for complete search history.

(56) References Cited

PUBLICATIONS

EP Office Action in European Application No. 18710220.7, dated Nov. 2, 2021, 8 pages.
Abbeel et al, "Apprenticeship learning via reinforcement learning" Proceedings of the twenty-first international conference on Machine learning, 2004, 8 pages.
Antos et al, "Learning near-optimal policies with bellman-residual minimization based fitted policy iteration and a single sample path" Machine Learning, 2008, 41 pages.
Asadi, M. L. Littman: "A new softmax operator for reinforcement learning", arXiv: 1612.05628x3, Dec. 21, 2016 (Dec. 21, 2016), XP080745018, Retrieved from the Internet: URL: https://arxiv.org/abs.1612.05628X3 [retrieved on May 23, 2018] sections 5 and 6.
Azar et al,: "Dynamic policy programming", arXivL 1004.2027v2, Sep. 6, 2011 (Sep. 6, 2011), XP080445439, Retrieved from the Internet: URL: https://arxiv.org/abs/1004.2027v2 [retrieved on May 23, 2018] section 3.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on a computer storage medium, for training a policy neural network used to select actions to be performed by a reinforcement learning agent interacting with an environment. In one aspect, a method includes obtaining path data defining a path through the environment traversed by the agent. A consistency error is determined for the path from a combined reward, first and last soft-max state values, and a path likelihood. A value update for the current values of the policy neural network parameters is determined from at least the consistency error. The value update is used to adjust the current values of the policy neural network parameters.

20 Claims, 3 Drawing Sheets

(56) References Cited

PUBLICATIONS

Fox et al, "Taming the noise in reinforcement learning via soft updates", arXiv: 1512.08562x3, Jan. 23, 2017 (Jan. 23, 2012), XP055477502, Retrieved from the Internet: URL: https://arxiv.org/abs/1512.08562v3 [retrieved on May 23, 2018] section 3.
Gomez et al, "Optimal control as a graphical model inference problem" arXiv, Jan. 2012, 26 pages.
Gruslys et al, "The reactor: A simple-efficient actor-critic architecture" arXiv, Apr. 2017, 12 pages.
Gu et al, "Deep reinforcement learning for robotic manipulation with asynchronous off-policy updates" arXiv, Nov. 2016, 9 pages.
Gu et al, "Q-prop: Sample-efficient policy gradient with an off-policy critic" arXiv, Feb. 2017, 13 pages.
Haamoja et al, "Reinforcement learning with deep energy-based policies" arXiv, Jul. 2017, 16 pages.
Ho et al, "Generative adversarial imitation learning" arXiv, Jun. 2016, 14 pages.
Huang et al, "Approximate maxent inverse optimal control and its application for mental simulation of human interactions" Association for the Advancement of Artificial Intelligence, 2015, 7 pages.
Kakade, "A natural policy gradient" NIPS, 2001, 8 pages.
Kappen, "Path integrals and symmetry breaking for optimal control theory" arXiv, Aug. 2005, 22 pages.
Kober et al, "Reinforcement learning in robotics: A survey" IJRR, 2013, 38 pages.
Levine et al, "End-to-end training of deep visuomotor policies" arXiv, Apr. 2016, 40 pages.
Lin, "Self-improving reactive agents based on reinforcement learning, planning and teaching," Machine learning 8.3, May 4, 1992, 293-321.
Li et al, "A contextual-bandit approach to personalized news article recommendation" arXiv, Feb. 2010, 10 pages.
Lillicrap et al, "Continuous control with deep reinforcement learning" arXiv, Feb. 2016, 14 page.
Littman, "Algorithms for sequential decision making" Thesis for the degree of Doctor of Philosophy, University of Brown University, May 1996, 283 pages.
Mnih et al, "Asynchronous methods for deep reinforcement learning" arXiv, Jun. 2016, 19 pages.
Mnih et al, "Human-level control through deep reinforcement learning" Nature, 2015, 13 pages.
Munos et al, "Safe and efficient off-policy reinforcement learning" arXiv, Nov. 2016, 18 pages.
Nachum et al, "Imrproving policy gradient by exploring underappreciated rewards" arXiv, Nov. 2017, 21 pages.
O'Donaghue et al: "PGQ: combinging policy gradient and Q-learning", arXiv: 1611.01626vl, Nov. 5, 2016 (Nov. 5, 2016), XP080729582, Retreived from the Internet: URL: https://arxiv.org/abs/1611.01626vl [retrieved on May 23, 2018] sections 2-5.
PCT International Search Report and Written Opinion in International Application No. PCT/US2018/019416, dated Jun. 4, 2018, 16 pages.
PCT International Preliminary Report on Patentability issued in International Application No. PCT/US2018/019416, dated Sep. 6, 2019, 10 pages.
Peng, R.J. Williams: "Incremnental multi-step Q-learning", Machine Learning, vol. 22, Nos. 1-3, Mar. 1996 (Mar. 1996), pp. 283-290, XP019213286, DOI: 10.1007/BF0014731 abstract.
Peters et al, "Relative entropy policy search" Proceedings of the Twenty-Fourth AAAI Conference on Artificial Intelligence, 2010, 6 pages.
Precup et al, "Off-policy temporal-difference learning with function approximation" Proceedings of the 17th International Conference on Machine Learning, 2001, 8 pages.
Precup, "Eligibility traces for off-policy policy evaluation" Computer Science Department Faculty Publication Series, 2000, 9 pages.
Schaul et al, "Prioritized experience replay" arXiv, Feb. 2016, 21 pages.
Schulman et al, "Equivalence between poligy gradients and soft Q-leaning" arXiv, Oct. 2018, 15 pages.
Schulman et al, "High-dimensional continuous control using generalized advantage estimation" arXiv, Sep. 2016, 14 pages.
Schulman et al, "Trust region policy optimization" arXiv, Jun. 2015, 16 pages.
Silver et al., "Deterministic policy gradient algorithms" International Conference on Machine Learning, 2014, 9 pages.
Sutton et al, "Introduction to Reinforcement Learning" Reinforcement Learning and Artificial Intelligence Laboratory, 2017, 20 pages.
Sutton et al, "Policy gradient methods for reinforcement learning with function approximation" NIPS, 1999, 7 pages.
Tesauro, "Temporal difference learning and TD-gammon" Commumcations of ACM, Mar. 1995, 16 pages.
Theocharous et al, "Personalized ad recommendation sysyems for life-time value optimization with guarantees" Proceedings of the Twenty-Fourth International Joint Conference on Artificial Intelligence, 2015, 7 pages.
Todorov, "Linearly-solvable Markov decision problems" NIPS, 2006, 8 pages.
Todorov, "Policy gradients in linearly-solvable MDPs" NIPS, 2010, 9 pages.
Wang et al, "Dueling network architectures for deep reinforcement learning" arXiv, Apr. 2016, 15 pages.
Wang et al, "Sample efficient actor-critic with experience replay" arXiv, Jul. 2017, 20 pages.
Watkins et al, "Q-learning" Machine Learning, 1992, 14 pages.
Watkins, "Learning from delayed rewards" Thesis for the degree of Doctor of Philosophy, King's College, May 1989, 241 pages.
Williams et al, "Function optimization using connectionist reinforcement learning algorithms" Connection Science, 1991, 30 pages.
Williams, "Simple statistical gradient-following algorithms for connectionist reinforcement learning" Machine Learning, 1992, 28 pages.
Ziebart et al, "Maximum entropy inverse reinforcement learning" Proceedings of the Twenty-Third AAAI Conference on Artifiicial Learning, 2008, 6 pages.
Ziebart: "Modeling purposeful adaptive behavior with the principle of maximum causal entropy", Doctoral Thesis in Computer Science At Carnegie Mellon University, Dec. 2010 (Dec. 2010), XP055477670, ISBN: 978-1-124-41421-8 parts II and III.

TRAINING POLICY NEURAL NETWORKS USING PATH CONSISTENCY LEARNING

CROSS REFERENCE TO RELATED APPLICATION

This application is a continuation application of U.S. application Ser. No. 16/504,934, filed Jul. 8, 2019, which is a continuation of International Application No. PCT/US2018/019416, filed Feb. 23, 2018, which claims the benefit under 35 U.S.C. 119 of Provisional Application No. 62/463,562, filed Feb. 24, 2017, all of which are incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains a policy neural network that is used to select actions to be performed by a reinforcement learning agent interacting with an environment.

According to a first aspect there is provided a method for training a policy neural network used to select actions to be performed by a reinforcement learning agent interacting with an environment by performing actions from a pre-determined set of actions, the policy neural network having a plurality of policy network parameters and being configured to process an input observation characterizing a current state of the environment in accordance with the policy network parameters to generate a score distribution that includes a respective score for each action in the pre-determined set of actions, and the method comprising: obtaining path data defining a path through the environment traversed by the agent, wherein the path is a sequence from a first observation to a last observation, and wherein the path data includes a plurality of observation-action-reward tuples, wherein the observation in each tuple is an observation characterizing a state of the environment, the action in each tuple is an action performed by the agent in response to the observation in the tuple, and the reward in each tuple is a numeric value received as a result of the agent performing the action in the tuple; determining a combined reward from the rewards in the tuples in the path data; determining a first soft-max state value for the first observation in the path in accordance with current values of state value network parameters of a state value neural network; determining a last soft-max state value for the last observation in the path in accordance with the current values of the state value network parameters of the state value neural network; determining a path likelihood for the path in accordance with current values of the policy parameters; determining a consistency error for the path from the combined reward, the first and last soft-max state values, and the path likelihood; determining a gradient of the path likelihood with respect to the policy parameters; determining a value update for the current values of the policy parameters from the consistency error and the gradient; and using the value update to adjust the current values of the policy parameters.

In some implementations, determining the combined reward comprises determining a discounted sum of the rewards in the tuples in the path.

In some implementations, the state value neural network is based on a Q neural network, and determining the first soft-max state value comprises: processing the first observation using the Q neural network in accordance with current values of Q network parameters to generate a respective Q value for each action in the predetermined set of actions; and determining the first soft-max state value V for the first observation that satisfies:

$$V = \tau \log \Sigma_a \left( \exp \frac{Q(a)}{\tau} \right),$$

where the sum is over the actions a in the predetermined set of actions, Q(a) is a Q value output of the Q neural network for the action, and $\tau$ is a constant value.

In some implementations, the state value neural network is based on a Q neural network, and determining the last soft-max state value comprises: processing the last observation using the Q neural network in accordance with current values of Q network parameters to generate a respective Q value for each action in the predetermined set of actions; and determining the last soft-max state value V for the last observation that satisfies:

$$V = \tau \log \Sigma_a \left( \exp \frac{Q(a)}{\tau} \right),$$

where the sum is over the actions a in the predetermined set of actions, Q(a) is a Q value output of the Q neural network for the action, and $\tau$ is a constant value.

In some implementations, the policy neural network is based on a Q neural network, and processing an observation using the policy neural network to generate a score distribution that includes a respective score for each action in the pre-determined set of actions comprises: processing the observation using the Q neural network in accordance with current values of Q network parameters to generate a respective Q value for each action in the predetermined set of actions; determining a soft-max state value for the observation that satisfies:

$$V = \tau \log \Sigma_a \left( \exp \frac{Q(a)}{\tau} \right)$$

where the sum is over the actions a in the predetermined set of actions, Q(a) is a Q value output of the Q neural network for the action, and τ is a constant value; and determining a score distribution π for the observation that satisfies:

$$\pi(a) = \exp\left\{\frac{Q(a) - V}{\tau}\right\},$$

where a is an action in the predetermined set of actions, π(a) is a score for the action in the score distribution, Q(a) is a Q value output of the Q neural network for the action a, V is the soft-max state value for the observation, and τ is a constant value.

In some implementations, determining the path likelihood for the path comprises: processing each observation other than the last observation in the path using the policy network to determine a respective score distribution in accordance with the current values of the policy network parameters; determining, for each observation other than the last observation in the path, a selected action score, wherein the selected action score is the action score for the action in the same tuple as the observation in the score distribution for the observation; and determining a discounted sum of the logarithms of the selected action scores.

In some implementations, the value update for the current values of the policy parameters is a product of the consistency error and the gradient.

In some implementations, the method further comprises: determining a gradient of the first soft-max state value with respect to the Q network parameters; determining a gradient of the last soft-max state value with respect to the Q network parameters; and determining a value update for the current values of the Q network parameters from the consistency error, the gradient of the first soft-max state value, and the gradient of the second soft-max state value for the last observation; and using the value update to adjust the current values of the Q network parameters.

In some implementations, the method further comprises generating the path on-policy by selecting the actions to be performed in response to the observations in the path using the policy neural network and in accordance with the current values of the policy network parameters.

In some implementations, the method further comprises sampling the path data defining the path from a replay memory storing data generated as a result of interactions of the agent with the environment.

In some implementations, the method further comprises providing the trained policy neural network for use in selecting actions to be performed by the reinforcement learning agent interacting with the environment.

According to a first aspect there is provided a method for training a policy neural network used to select actions to be performed by a reinforcement learning agent interacting with an environment by performing actions from a predetermined set of actions, the policy neural network having a plurality of policy network parameters and being configured to process an input observation characterizing a current state of the environment in accordance with the policy network parameters to generate a score distribution that includes a respective score for each action in the predetermined set of actions, and the method comprising: obtaining path data defining a path through the environment traversed by the agent, wherein the path is a sequence from a first observation to a last observation, and wherein the path data includes a plurality of observation-action-reward tuples, wherein the observation in each tuple is an observation characterizing a state of the environment, the action in each tuple is an action performed by the agent in response to the observation in the tuple, and the reward in each tuple is a numeric value received as a result of the agent performing the action in the tuple; determining a combined reward from the rewards in the tuples in the path data; determining a first soft-max state value for the first observation in the path in accordance with current values of Q network parameters of a Q neural network; determining a last soft-max state value for the last observation in the path in accordance with the current values of the Q network parameters of the Q neural network; determining a path likelihood for the path in accordance with current values of the policy parameters; determining a consistency error for the path from the combined reward, the first and last soft-max state values, and the path likelihood; determining a gradient of the path likelihood with respect to the policy parameters; determining a value update for the current values of the policy parameters from the consistency error and the gradient; and using the value update to adjust the current values of the policy parameters.

According to a third aspect, there is provided a system comprising one or more computers and one or more storage devices storing instructions that when executed by the one or more computers cause the one or more computers to perform the operations of any of the previously described methods.

According to a fourth aspect, there are provided one or more computer storage media storing instructions that when executed by one or more computers cause the one or more computers to perform the operations of any of the previously described methods.

Particular embodiments of the subject matter described in this specification can be implemented so as to realize one or more of the following advantages.

The reinforcement learning system as described in this specification can be trained using both on-policy and off-policy path data in order to update, and preferably improve, an action selection policy based on which actions may be selected for performance by an agent which interacts with an environment. Path data is data characterizing observation-action-reward tuples for each of multiple time steps as an agent interacts with an environment. "Reward" in this sense may refer to an indication of whether the agent has accomplished a task (e.g., navigating to a target location in the environment) or of the progress of the agent towards accomplishing a task. On-policy path data refers to path data where the agent interacts with the environment by selecting actions based on the current action selection policy of the reinforcement learning system. On the other hand, off-policy path data refers to any path data, including path data where the agent interacts with the environment by selecting actions based on an action selection policy that is different from the action selection policy of the reinforcement learning system. Since the reinforcement learning system as described in this specification can be trained using both on-policy and off-policy path data, it can be trained more quickly (e.g., over fewer training iterations) and achieve better performance (e.g., by enabling the agent to perform tasks more effectively) than reinforcement learning systems that can only be trained using on-policy path data (e.g., reinforcement learning systems trained using policy-based methods).

Moreover, since the reinforcement learning system as described in this specification can be trained using off-policy path data, it can be trained using expert trajectories. Expert trajectories are off-policy path data generated by the interaction of an expert agent with the environment, where an expert agent is an agent that interacts with the environment in accordance with an action selection policy that is unknown but that causes the expert agent to effectively perform tasks. Since the reinforcement learning system as described in this specification can be trained with expert trajectories, it can be trained more quickly and achieve better performance than conventional reinforcement learning systems that can only be trained using on-policy path data.

Moreover, since it can be trained more quickly, the reinforcement learning system as described in this specification consumes fewer computational resources during training (e.g., memory and computing power) than conventional reinforcement learning systems that can only be trained using on-policy path data.

The reinforcement learning system as described in this specification can be trained using a path consistency learning loss function that enables stable parameter value updates (i.e., parameter value updates that are likely to cause the system select actions that enable the agent to effectively perform tasks). In contrast, conventional reinforcement learning systems (e.g., systems trained using Q-learning methods) may exhibit unstable behavior during training, unless extensive hyper-parameter tuning is performed to find a combination of hyper-parameters that results in stability. Therefore, by reducing the necessary amount of hyper-parameter tuning, the reinforcement learning system as described in this specification consumes fewer computational resources during training than conventional reinforcement learning systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
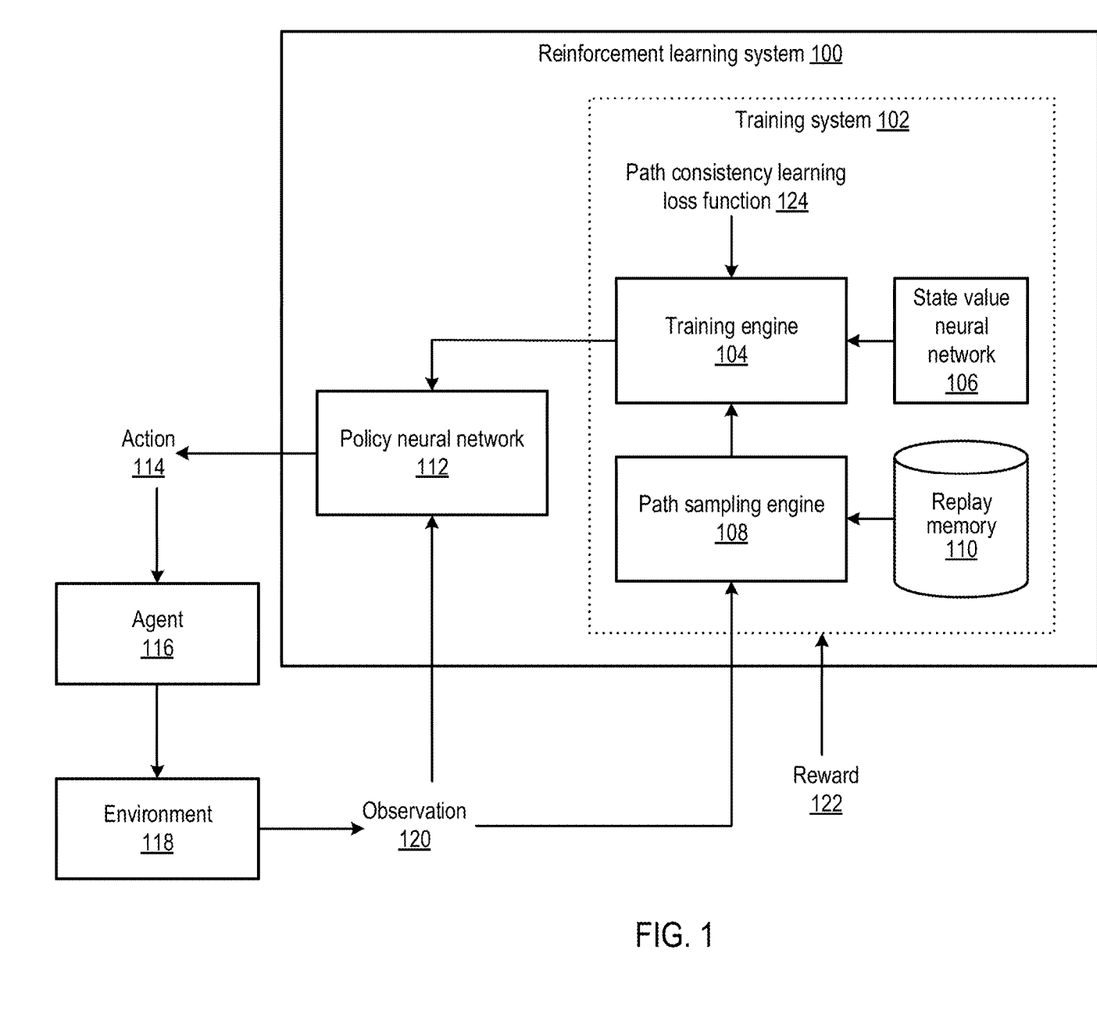
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions 114 to be performed by an agent 116 interacting with an environment 118 at each of multiple time steps. At each time step, the system 100 receives data characterizing the current state of the environment 118, e.g., an image of the environment, and selects an action 114 to be performed by the agent 116 in response to the received data. Data characterizing a state of the environment 118 will be referred to in this specification as an observation 120.

The reinforcement learning system 100 described herein is widely applicable and is not limited to one specific implementation. However, for illustrative purposes, a small number of example implementations are described below.

In some other implementations, the environment 118 is a real-world environment and the agent 116 is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle. In some of these implementations, the observations 120 may be generated by or derived from sensors of the agent 116. For example, the observations 120 may be captured by a camera of the agent 116. As another example, the observations 120 may be derived from data captured from a laser sensor of the agent 116. As another example, the observations may be hyperspectral images captured by a hyperspectral sensor of the agent 116.

In some implementations, the environment 118 may be a simulated environment and the agent 116 may be implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation environment. In these implementations, the actions may be control inputs to control the simulated user or simulated vehicle.

At each time step, the state of the environment 118 at the time step (as characterized by the observation 120) depends on the state of the environment 118 at the previous time step and the action 114 performed by the agent 116 at the previous time step.

At each time step, the system 100 receives a reward 122 based on the current state of the environment 118 and the action 114 of the agent 116 at the time step. In general, the reward 122 is a numerical value. The reward 122 can be based on any event or aspect of the environment 118. For example, the reward 122 may indicate whether the agent 116 has accomplished a task (e.g., navigating to a target location in the environment 118) or the progress of the agent 116 towards accomplishing a task.

The system 100 uses a policy neural network 112 in selecting actions to be performed by the agent 116 in response to observations 120 at each time step. In particular, the policy neural network 112 is configured to receive an observation 120 as input and to process the input in accordance with a set of parameters, referred to in this specification as policy neural network parameters, to generate a policy output that the system 100 uses to determine an action 114 to be performed by the agent 116 at the time step. The policy output is a score distribution that includes a respective score for each action in a predetermined set of actions. In some cases, the system 100 determines the action 114 to be performed by the agent 116 at the time step to be the action with the highest score. In some other cases, the system 100 processes the scores (e.g., using a soft-max function) to generate a probability distribution over the predetermined set of actions. In these cases, the system 100 determines the action 114 to be performed by the agent 116 at the time step by sampling an action from the predetermined set of actions in accordance with the probability distribution.

In some cases, the system 100 determines the action 114 to be performed by the agent 116 using an exploration strategy. For example, the system 100 may use an $\in$-greedy exploration strategy. In this example, ∈ is a number between 0 and 1. The system 100 determines the action 114 to be performed by the agent 116 based on the policy output generated by the policy neural network 112 with probability (1−∈), and determines the action 114 to be performed by the agent 116 randomly with probability E.

The system 100 includes a training system 102 that is configured to train the system 100 (including the policy neural network 112) over multiple training iterations using reinforcement learning techniques. The training system 102 trains the system 100 to cause the policy neural network 112 to generate policy outputs that result in the selection of actions 114 to be performed by the agent 116 which maximize a long-term time-discounted reward (such as an expected entropy regularized long-term time-discounted reward) received by the system 100, and thereby cause the agent 116 to effectively perform given tasks.

The long-term time-discounted reward is a measure of the expected future values of the rewards 122 received by the system 100, where the rewards 122 are weighted by a discount factor reflecting the rewards 122 received sooner are more valuable to the system 100 than rewards 122 received later. In examples in which the long-term time-discounted reward is an expected entropy regularized long-term time-discounted reward, it also includes an entropy regularization term, that encourages exploration and helps prevent the early convergence of the policy neural network 112 to sub-optimal action selection policies. The expected entropy regularized long-term time-discounted reward received by the system 100 from a state s of the environment 118 can be recursively expressed as:

$$O(s, \pi) = \sum_a \pi(a \mid s) \ [r(s, a) - \tau \log \pi(a \mid s) + \gamma O(s', \pi)],$$

where the sum is over the predetermined set of actions a that can be performed by the agent 116, π(a|s) is the score corresponding to action a from the score distribution generated by policy neural network 112 in response to processing the observation of the environment in the state s, r(s, a) is the reward received by the system 100 is the agent 116 performs action a while the environment 118 is in state s, τ is a hyper-parameter governing the degree of entropy regularization, γ is a discount factor, and s' is the state of the environment 118 at the next time step if the current state of the environment 118 is s and the agent 116 performs action a. In some implementations, the parameter τ is set to zero (or near zero), in which case the training system 102 trains the system 100 to cause the policy neural network 112 to generate policy outputs that result in the selection of actions 114 to be performed by the agent 116 which maximize the expected long-term time-discounted reward received by the system 100 (without entropy regularization).

The training system 102 includes a path sampling engine 108 that is configured to, at each training iteration, obtain path data that defines one or more paths traversed by an agent through the environment 118 over a predetermined number of time steps. For each path, the path data includes an observation-action-reward tuple for each time step of the path, including the observation 120 at the time step, the action 114 performed at the time step, and the reward 122 received at the time step.

In some implementations, the path sampling engine 108 obtains offline path data from a replay memory 110. Offline path data is path data that can include paths traversed by an agent performing actions selected based on policy outputs that are different from those that would be generated in accordance with the current values of the policy neural network parameters. The replay memory 110 stores path data from paths previously traversed by the agent 116, from paths previously traversed by an expert agent, or both. An expert agent is an agent that interacts with the environment 118 in accordance with an action selection policy that is unknown but that causes the expert agent to successfully accumulate long-term time-discounted rewards by effectively performing tasks. For example, if the system 100 receives rewards in response to the agent 116 making progress towards accomplishing a task, an expert agent may be an agent controlled by a person who is skilled at the task to be performed by the agent 116.

In some implementations, the path sampling engine 108 obtains the path data by generating path data on-policy. Generating path data on-policy refers to selecting actions 114 to be performed by the agent 116 at each of the predetermined number of time steps based on policy outputs generated in accordance with the current values of the policy neural network parameters. In some cases, the path sampling engine generates multiple different on-policy paths.

In some implementations, the path sampling engine 108 obtains path data both by sampling from the replay memory 110 and by generating path data on-policy.

The training system 102 includes a state value neural network 106 that is configured to receive an observation 120 as input and to process the input in accordance with a set of parameters, referred to in this specification as state value neural network parameters, to generate as output an estimated state value. A state value refers to the expected entropy regularized long-term time-discounted reward that would be received by the system 100 if, starting from the current state of the environment 118, the agent 116 performs actions that are selected based on the policy outputs generated by the policy neural network 112 in accordance with the current values of the policy neural network parameters, i.e., and not based on a different action selection policy.

The training system 102 includes a training engine 104 that is configured to, at each training iteration, update the current values of the policy neural network parameters and the state value neural network parameters. In particular, the training engine 104 uses gradient descent to adjust the policy neural network parameters and the state value neural network parameters to minimize a path consistency learning loss function 124. In general, a path consistency learning loss function (which will be described in more detail with reference to FIG. 2 and FIG. 3) is a loss function that includes consistency error terms that measure a consistency between policy outputs (i.e., as generated by the policy neural network 112) and estimated state values (i.e., as generated by the state value neural network 106) for any path through the environment 118, and in particular, the paths of the path data obtained by the path sampling engine 108.

By adjusting the policy neural network parameters and the state value neural network parameters to minimize the path consistency learning loss function 124, the training engine 102 causes the policy neural network 112 to generate policy outputs that, when used to select actions 114 to be performed by the agent 116, maximize the expected entropy regularized long-term time-discounted reward received by the system 100 and thereby cause the agent to effectively perform given tasks. An example process for training the reinforcement learning system 100 is described with reference to FIG. 2.

In some implementations, the policy neural network 112 and the state value neural network 106 are implemented as separate neural networks that do not share parameter values and are each separately trained by the training engine 104. The policy neural network 112 and the state value neural network 106 may be implemented as any appropriate neural network model, such as a feed-forward neural network (e.g., a multi-layer perceptron or a convolutional neural network) or a recurrent neural network (e.g., a long short-term memory network).

In some other implementations, the system integrates the policy neural network 112 and the state value neural network 106 into a single model. In these implementations, rather than including a separate policy neural network 112 and state value neural network 106, the system 100 includes a neural network referred to in this specification as a Q neural network, and generates both the policy output (otherwise generated by the policy neural network 112) and the estimated state values (otherwise generated by the state value network 106) based on the output of the Q neural network.

In some of these implementations, the Q neural network is configured to receive as input an observation 120 and to process the input in accordance with a set of parameters, referred to in this specification as Q neural network parameters, to generate as output a different estimated Q-value for each action of the predetermined set of actions. Given an observation, a Q-value for an action is a scalar value that is the expected entropy regularized long-term time-discounted reward received by the system 100 if the agent 116 first selects the given action (i.e., in response to the given observation) and then at subsequent time steps selects actions in accordance with an optimal action selection policy (i.e., an action selection policy that maximizes the expected entropy regularized long-term time-discounted reward received). In general, other Q neural network architectures are possible. For example, the Q neural network may be configured to receive as input both an observation and a representation of an action, and to process the inputs to generate as output an estimated Q-value for the particular input action.

The system 100 generates the state value estimate for an observation from the output of the Q neural network as:

$$V = \tau \log \sum_a \exp\left(\frac{Q(a)}{\tau}\right),$$

where $\tau$ is the hyper-parameter governing the degree of entropy regularization (as described earlier), the sum is over the actions a in the predetermined set of actions, and Q(a) is the estimated Q-value for action a (i.e., generated by the Q neural network by processing the observation).

The system 100 generates the policy output for an observation from the output of the Q neural network as:

$$\pi(a) = \exp\left\{\frac{Q(a) - V}{\tau}\right\},$$

where $\pi$ is the policy output (i.e., the score distribution over the set of predetermined actions), $\pi(a)$ is the score for action a in the score distribution $\pi$, Q(a) is the estimated Q-value corresponding to action a for the observation, V is the state value estimate for the observation (determined from the output of the Q neural network as described above), and $\tau$ is the hyper-parameter governing the degree of entropy regularization (as described earlier).

When the system includes a Q neural network rather than a separate policy neural network 112 and state value neural network 106, the training engine 104 operates analogously, by updating the current values of the Q neural network parameters using gradient descent to adjust the Q neural network parameters to minimize the path consistency learning loss function 124.

The Q neural network may be implemented as any appropriate neural network model. For example, the Q neural network may be implemented as a feed-forward neural network (e.g., a multi-layer perceptron or a convolutional neural network) or a recurrent neural network (e.g., a long short-term memory network).

Figure 2:
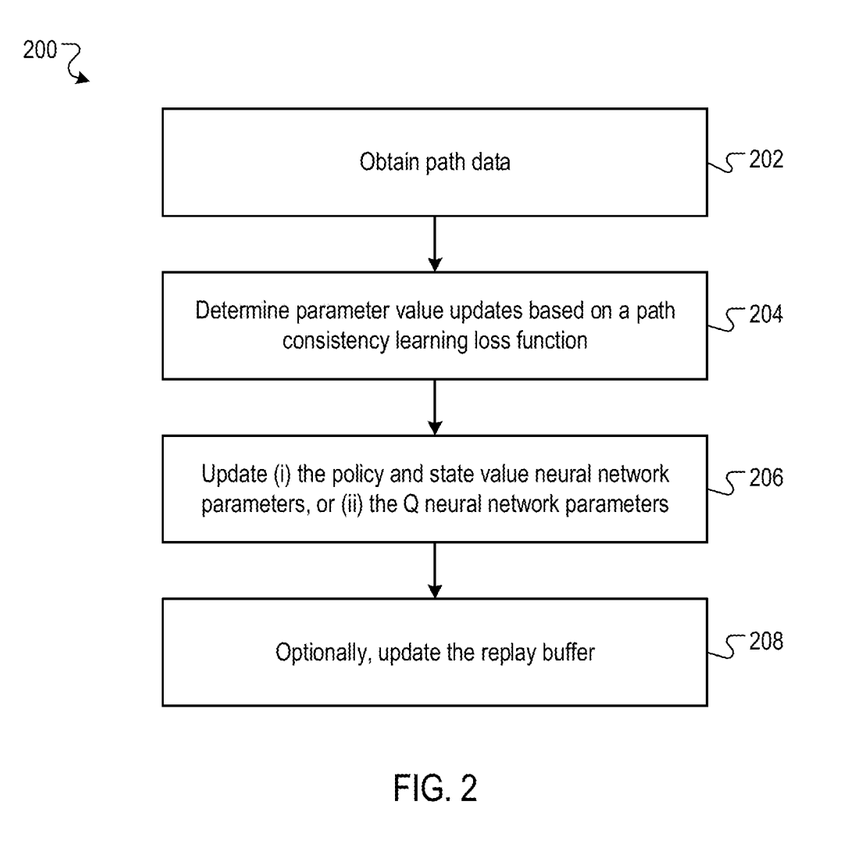
FIG. 2 is a flow diagram of an example process for training a reinforcement learning system based on a path consistency learning loss function.

FIG. 2 is a flow diagram of an example process 200 for training a reinforcement learning system based on a path consistency learning loss function. For convenience, the process 200 will be described as being performed by a system of one or more computers located in one or more locations. For example, a training system, e.g., the training system 102 of FIG. 1, appropriately programmed in accordance with this specification, can perform the process 200.

The system obtains path data (202). The path data defines one or more different paths traversed by an agent through the environment over a predetermined number of time steps. For each path, the path data includes an observation-action-reward tuple for each time step, including the observation at the time step, the action performed at the time step, and the reward received at the time step.

In some implementations, the system obtains offline path data from a replay memory. Offline path data is path data that can include paths traversed by an agent performing actions selected based on policy outputs that are different from those generated in accordance with the current values of the policy neural network parameters. The replay memory stores path data from paths previously traversed by the agent and/or from paths previously traversed by an expert agent. An expert agent is an agent that interacts with the environment in accordance with an action selection policy that is unknown but that causes the expert agent to successfully accumulate long-term time-discounted rewards. For example, if the system receives rewards in response to the agent making progress towards accomplishing a task, an expert agent may be an agent controlled by a person who is skilled at the task to be performed by the agent.

In some implementations, the system randomly samples path data from the replay memory. In some implementations, the system determines a probability distribution over the paths in the replay memory and samples path data from the replay memory in accordance with the probability distribution. In these implementations, the system may determine the probability distribution by assigning a different probability to each path in the replay memory based on the reward data associated with the path. For example, the system may assign a higher probability to paths where a measure of the total reward associated with the path (e.g., the sum of the rewards at each time step) is greater.

In some implementations, the system obtains the path data by generating path data on-policy. Generating path data on-policy refers to selecting actions to be performed by the agent at each of the predetermined number of time steps based on policy outputs generated in accordance with the current values of the policy neural network parameters. In some cases, the path sampling engine generates multiple different on-policy paths.

In some implementations, the system obtains path data both by sampling offline path data from the replay memory and by generating path data on-policy.

The system determines parameter value updates for (i) the policy neural network parameters and the state value neural network parameters, or (ii) the Q neural network parameters, depending on whether the policy neural network and the state value neural network are implemented as separate models or integrated into a single model based on a Q neural network (as described earlier) (204).

The system is configured to determine parameter value updates for (i) the policy and state value neural network parameters, or (ii) the Q neural network parameters, to minimize a path consistency learning loss function. The path consistency learning loss function characterizes a consistency between policy outputs and estimated state values for any path through the environment, and in particular, the paths of the obtained path data. For example, the path consistency learning loss function may have the form:

$$\mathcal{L} = \sum_{P \in E} \frac{1}{2} C(P)^2,$$

where P is a path from the set of obtained path data E, and C(P) is a consistency error for path P. In general, the consistency error C(P) for a path P depends on the output of the policy neural network and the state value neural network for observations in the path.

The system determines the parameter value updates by computing the gradient of the path consistency learning loss function with respect to the parameters of (i) the policy and state value neural networks, or (ii) the Q neural network (depending on the implementation). An example process for determining parameter value updates based on a path consistency learning loss function is described with reference to FIG. 3.

The system updates (i) the policy and state value neural network parameters, or (ii) the Q neural network parameters (depending on the implementation), using the determined parameter value updates (206). Specifically, the system updates the parameters of a network (e.g., a policy, state value, or Q neural network) based on a determined parameter value update by:

$$\theta \leftarrow \theta + \eta \cdot \Delta\theta,$$

where $\theta$ are the parameters of the network, $\leftarrow$ indicates the assignment operation, $\eta$ is a learning rate (that controls the rate at which the values of the parameters are updated), and $\Delta\theta$ is the parameter value update.

By adjusting the network parameters to minimize the path consistency learning loss, the system causes policy outputs to be generated that, when used to select actions to be performed by the agent, maximize the expected entropy regularized long-term time-discounted reward received by the system.

Optionally, the system updates the replay buffer by inserting one or more paths from on-policy path data generated at the training iteration (e.g., as described in 202) (208). In some implementations, the system inserts each generated on-policy path into the replay buffer. In some implementations, the system inserts a generated on-policy path into the replay buffer with a fixed probability, for example, 10%, or any other appropriate probability. If the replay buffer is full, then the system can insert a given path into the replay buffer by selecting (e.g., randomly) a path that is currently in the replay buffer and overwriting (i.e., replacing) it with the given path.

Figure 3:
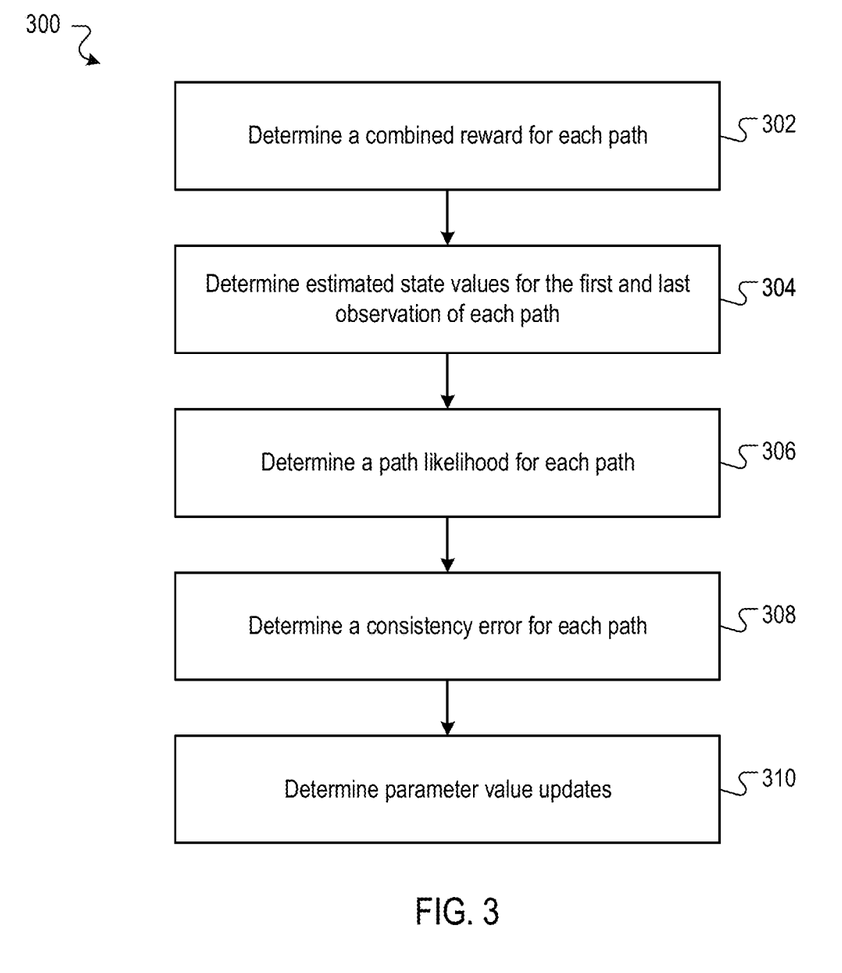
FIG. 3 is a flow diagram of an example process for determining parameter value updates based on a path consistency learning loss function.

FIG. 3 is a flow diagram of an example process 300 for determining parameter value updates based on a path consistency learning loss function. For convenience, the process 300 will be described as being performed by a system of one or more computers located in one or more locations. For example, a training system, e.g., the training system 102 of FIG. 1, appropriately programmed in accordance with this specification, can perform the process 300.

For each path of the obtained path data, the system determines a combined reward for the path based on the rewards received at one or more time steps in the path (302). For example, the system may determine the combined reward for a path to be the discounted sum of the rewards received at each time step in the path except for the last time step, i.e.:

$$\sum_{j=0}^{d-1} \gamma^j r_j,$$

where the sum is over the time steps of the path except the last time step, $\gamma$ is the discount factor, and $r_j$ is the reward received for time step j in the path.

For each path of the obtained path data, the system determines estimated state values for the first and last observation of the path (304).

In some implementations, the system provides the first and last observation of each path as input to a state value neural network that processes the input to generate as output respective estimated state values for the first and last observation of the path. In some other implementations, the system provides the first and last observation of each path as input to a Q neural network that processes the input to generate as output respective estimated Q-values for each action in the predetermined set of actions, for the first and last observation in the path. In these implementations, the system determines the estimated state values for the first and last observation based on the respective Q-values, as described earlier.

For each path of the obtained path data, the system determines a path likelihood for the path (306).

For each path, the system determines a respective score distribution over the predetermined set of actions for each observation in the path other than the last observation. In some implementations, the system provides each observation in the path other than the last observation as inputs to a policy neural network that processes the inputs to generate as output respective score distributions over the predetermined set of actions for each observation in the path other than the last observation. In some other implementations, the system provides each observation in the path other than the last observation as input to a Q neural network that processes the inputs to generate as output respective estimated Q-values for each action in the predetermined set of actions, for each observation in the path other than the last observation. In these implementations, the system determines the respective score distributions for each observation in the path other than the last observation based on the respective Q-values, as described earlier.

For each path, the system determines, for each observation in the path other than the last observation, a selected action score. To determine the selected action score for an observation in a path, the system identifies the score distribution over the set of predetermined actions that the system determined for the observation. The system identifies the selected action score as the score from the score distribution for the action corresponding to the observation in the path according to the path data.

For each path, the system determines the path likelihood for the path based on the selected action scores. For example, the system may determine the path likelihood for a path by:

$$\sum_{j=0}^{d-1} \gamma^j \log \pi(a_j \mid P_j),$$

where the sum is over each observation in the path P except for the last observation, $\gamma$ is a discount factor, and $\pi(a_j|P_j)$ is the selected action score for the observation $P_j$ corresponding to the j-th time step in the path.

For each path of the obtained path data, the system determines a consistency error for the path (308). Specifically, the system determines the consistency error for a path by combining at least (i) the combined reward for the path, (ii) the estimated state values for the first and last observations in the path, and (iii) the path likelihood for the path. For example, the system may determine the consistency error for a path P to be:

$$C(P) = -V(P_0) + \gamma^d V(P_d) + \sum_{j=0}^{d-1} \gamma^j r_j - \tau \sum_{j=0}^{d-1} \gamma^j \log \pi(a_j \mid P_j),$$

where $V(P_0)$ is the estimated state value estimate for the first observation in the path, $V(P_d)$ is the estimated state value for the last observation in the path, $\gamma$ is a discount factor, (d+1) is predetermined number of time steps in the path, $r_j$ is the reward received at the j-th time step in the path, $\tau$ is a hyper-parameter governing the degree of entropy regularization (as described earlier), and $\pi(a_j|P_j)$ is the selected action score for the j-th observation in the path.

The system determines parameter value updates for (i) the policy neural network parameters and the state value neural network parameters, or (ii) the Q neural network parameters, depending on whether the policy neural network and the state value neural network are implemented as separate models or integrated into a single model based on a Q neural network (as described earlier) (310).

In general, the system determines the parameter value updates by computing the gradient of the path consistency learning loss function with respect to the parameters of (i) the policy and state value neural networks, or (ii) the Q neural network (again, depending on the implementation). As described earlier, the path consistency learning loss function is based on the consistency errors for each of the paths of the obtained path data.

In implementations where the consistency error has the specific form described above, then the parameter value updates for a policy neural network may have the form:

$$\Delta\theta = \sum_{P \in E} \Delta\theta_P,$$

$$\Delta\theta_P = C(P) \cdot \nabla_\theta \sum_{j=0}^{d-1} \gamma^j \log \pi_\theta(a_j \mid P_j),$$

where $\Delta\theta$ is the overall parameter value update, $\Delta\theta_P$ is the parameter value update corresponding to path P from the set of obtained path data E, C(P) is the consistency error for path P, $\nabla_\theta$ is the gradient with respect to the parameters of the policy neural network (e.g., computed by backpropagation), j is an index over the predetermined number of time steps in each path, $\gamma$ is a discount factor, and $\pi_\theta(a_j|P_j)$ is the selected action score for the j-th observation in path P (where the dependence on the parameters $\theta$ of the policy neural network is made explicit).

In implementations where the consistency error has the specific form described above, then the parameter value updates for a state value neural network may have the form:

$$\Delta\phi = \sum_{P \in E} \Delta\phi_P,$$

$$\Delta\phi = C(P) \cdot \nabla_\phi (V_\phi(P_0) - \gamma^d V_\phi(P_d)),$$

where $\Delta\phi$ is the overall parameter value update, $\Delta\phi_P$ is the parameter value update corresponding to path P from the set of obtained path data E, C(P) is the consistency error for path P, $\nabla_\phi$ is the gradient with respect to the parameters of the state value neural network (e.g., computed by backpropagation), $V_\phi(P_0)$ is the estimated state value (i.e., as generated by the state value neural network) for the first observation in the path, $V_\phi(P_d)$ is the estimated state value for the last observation in the path (where the dependence on the parameters $\phi$ of the state value neural network are made explicit), (d+1) is the number of predetermined steps in each path, and $\gamma$ is a discount factor.

In implementations where the consistency error has the specific form described above, then the parameter value updates for a Q neural network may have the form:

$$\Delta\lambda = \sum_{P \in E} \Delta\lambda_P,$$

$$\Delta\lambda_P = C(P) \cdot \nabla_\lambda \sum_{j=0}^{d-1} \gamma^j \log \pi_\lambda(a_j \mid P_j) + C(P) \cdot \nabla_\lambda (V_\lambda(P_0) - \gamma^d V_\lambda(P_d)),$$

where $\Delta\lambda$ is the overall parameter value update, $\Delta\lambda_P$ is the parameter value update corresponding to path P from the set of obtained path data E, C(P) is the consistency error for path P, $\nabla_\lambda$ is the gradient with respect to the parameters of the Q neural network (e.g., computed by backpropagation), j is an index over the predetermined number of time steps in each path, $\gamma$ is a discount factor, $\pi_\lambda(a_j|P_j)$ is the selected action score for the j-th observation in path P (where the dependence on the parameters $\lambda$ of the Q neural network is made explicit), $V_\lambda(P_0)$ is the estimated state value for the first observation in the path, and $V_\lambda(P_d)$ is the estimated state value for the last observation in the path (where the dependence on the parameters $\lambda$ of the Q neural network is made explicit). In some implementations, different learning rates (as described with reference to 206) are applied to the first and second terms of the Q neural network parameter value update described above.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a policy neural network used to select actions to be performed by a reinforcement learning agent interacting with an environment by performing actions from a pre-determined set of actions, the policy neural network having a plurality of policy network parameters and being configured to process an input observation characterizing a current state of the environment in accordance with the policy network parameters to generate a score distribution that includes a respective score for each action in the pre-determined set of actions, the method comprising:
    obtaining path data defining a path through the environment traversed by the agent, wherein the path is a sequence from a first observation to a last observation, and wherein the path data includes a plurality of experience tuples, wherein each experience tuple comprises a respective observation and a respective action, the observation in each experience tuple is an observation characterizing a state of the environment, and the action in each experience tuple is an action performed by the agent in response to the observation in the experience tuple;
    determining a path likelihood for the path, in accordance with current values of the policy network parameters, based only on observations that are included in the path, comprising:
        for each observation in a set of multiple observations comprising only observations that are included in the path:
            processing the observation using the policy neural network to determine a respective score distribution in accordance with the current values of the policy network parameters; and
            determining a selected action score, wherein the selected action score is the action score for the action in the same experience tuple as the observation in the score distribution for the observation; and
        determining the path likelihood for the path using the selected action scores corresponding to the observations in the set of multiple observations comprising only observations included in the path;
    determining a value update for the current values of the policy network parameters from at least the path likelihood; and
    using the value update to adjust the current values of the policy network parameters.

2. The method of claim 1, wherein each experience tuple further comprises a respective reward that is a numerical value received as a result of the agent performing the action in the experience tuple, wherein determining the value update for the current values of the policy network parameters from at least the path likelihood comprises:
    determining a combined reward from the rewards in the experience tuples in the path data;
    determining a consistency error for the path based on at least the combined reward and the path likelihood; and
    determining the value update for the current values of the policy network parameters using the consistency error for the path.

3. The method of claim 2, wherein determining the combined reward comprises determining a discounted sum of the rewards in the experience tuples in the path data.

4. The method of claim 2, wherein determining the consistency error for the path based on at least the combined reward and the path likelihood comprises:
- determining a first soft-max state value for the first observation in the path in accordance with current values of state value network parameters of a state value neural network;
- determining a last soft-max state value for the last observation in the path in accordance with the current values of the state value network parameters of the state value neural network; and
- determining the consistency error for the path based on at least the first and last soft-max state values, in addition to the combined reward and the path likelihood.

5. The method of claim 4, wherein the state value neural network is based on a Q neural network, and determining the first soft-max state value comprises:
- processing the first observation using the Q neural network in accordance with current values of Q network parameters to generate a respective Q value for each action in the predetermined set of actions; and
- determining the first soft-max state value V for the first observation that satisfies:

$$V = \tau \log \Sigma_a \left( \exp \frac{Q(a)}{\tau} \right),$$

where the sum is over the actions a in the predetermined set of actions, Q(a) is a Q value output of the Q neural network for the action, and τ is a constant value.

6. The method of claim 4, wherein the state value neural network is based on a Q neural network, and determining the last soft-max state value comprises:
- processing the last observation using the Q neural network in accordance with current values of Q network parameters to generate a respective Q value for each action in the predetermined set of actions; and
- determining the last soft-max state value V for the last observation that satisfies:

$$V = \tau \log \Sigma_a \left( \exp \frac{Q(a)}{\tau} \right),$$

where the sum is over the actions a in the predetermined set of actions, Q(a) is a Q value output of the Q neural network for the action, and τ is a constant value.

7. The method of claim 1, wherein the policy neural network is based on a Q neural network, and processing an observation using the policy neural network to generate a score distribution that includes a respective score for each action in the pre-determined set of actions comprises:
- processing the observation using the Q neural network in accordance with current values of Q network parameters to generate a respective Q value for each action in the predetermined set of actions;
- determining a soft-max state value for the observation that satisfies:

$$V = \tau \log \Sigma_a \left( \exp \frac{Q(a)}{\tau} \right)$$

where the sum is over the actions a in the predetermined set of actions, Q(a) is a Q value output of the Q neural network for the action, and τ is a constant value; and
- determining a score distribution π for the observation that satisfies:

$$\pi(a) = \exp\left\{ \frac{Q(a) - V}{\tau} \right\},$$

where a is an action in the predetermined set of actions, π(a) is a score for the action in the score distribution, Q(a) is a Q value output of the Q neural network for the action a, V is the soft-max state value for the observation, and τ is a constant value.

8. The method of claim 1, wherein determining the path likelihood for the path using the selected action scores corresponding to the observations in the set of multiple observations comprising only observations included in the path comprises:
- determining a discounted sum of logarithms of the selected action scores, wherein the set of multiple observations comprises every observation included in the path other than the last observation in the path.

9. The method of claim 2, wherein determining the value update for the current values of the policy network parameters using the consistency error for the path comprises:
- determining gradients of an objective function with respect to the policy network parameters, wherein the objective function depends on the consistency error; and
- determining the value update for the current values of the policy network parameters using the gradients.

10. The method of claim 5, further comprising:
- determining a gradient of the first soft-max state value with respect to the Q network parameters;
- determining a gradient of the last soft-max state value with respect to the Q network parameters; and
- determining a value update for the current values of the Q network parameters from the consistency error, the gradient of the first soft-max state value, and the gradient of the last soft-max state value; and
- using the value update to adjust the current values of the Q network parameters.

11. The method of claim 1, further comprising:
- generating the path on-policy by selecting the actions to be performed in response to the observations in the path using the policy neural network and in accordance with the current values of the policy network parameters.

12. The method of claim 1, further comprising:
- sampling the path data defining the path from a replay memory storing data generated as a result of interactions of the agent with the environment.

13. The method of claim 1, further comprising:
- providing the trained policy neural network for use in selecting actions to be performed by the reinforcement learning agent interacting with the environment.

14. A system comprising:
- one or more computers; and
- one or more storage devices communicatively coupled to the one or more computers, wherein the one or more storage devices store instructions that, when executed by the one or more computers, cause the one or more computers to perform operations for training a policy neural network used to select actions to be performed by a reinforcement learning agent interacting with an environment by performing actions from a pre-determined set of actions, the policy neural network having a plurality of policy network parameters and being configured to process an input observation characterizing a current state of the environment in accordance with the policy network parameters to generate a score distribution that includes a respective score for each action in the pre-determined set of actions, the operations comprising:

obtaining path data defining a path through the environment traversed by the agent, wherein the path is a sequence from a first observation to a last observation, and wherein the path data includes a plurality of experience tuples, wherein each experience tuple comprises a respective observation and a respective action, the observation in each experience tuple is an observation characterizing a state of the environment, and the action in each experience tuple is an action performed by the agent in response to the observation in the experience tuple;

determining a path likelihood for the path, in accordance with current values of the policy network parameters, based only on observations that are included in the path, comprising:

for each observation in a set of multiple observations comprising only observations that are included in the path:

processing the observation using the policy neural network to determine a respective score distribution in accordance with the current values of the policy network parameters; and determining a selected action score, wherein the selected action score is the action score for the action in the same experience tuple as the observation in the score distribution for the observation; and determining the path likelihood for the path using the selected action scores corresponding to the observations in the set of multiple observations comprising only observations included in the path;

determining a value update for the current values of the policy network parameters from at least the path likelihood; and using the value update to adjust the current values of the policy network parameters.

15. The system of claim 14, wherein each experience tuple further comprises a respective reward that is a numerical value received as a result of the agent performing the action in the experience tuple, wherein determining the value update for the current values of the policy network parameters from at least the path likelihood comprises:

determining a combined reward from the rewards in the experience tuples in the path data;

determining a consistency error for the path based on at least the combined reward and the path likelihood; and determining the value update for the current values of the policy network parameters using the consistency error for the path.

16. The system of claim 15, wherein determining the combined reward comprises determining a discounted sum of the rewards in the experience tuples in the path data.

17. The system of claim 15, wherein determining the consistency error for the path based on at least the combined reward and the path likelihood comprises:

determining a first soft-max state value for the first observation in the path in accordance with current values of state value network parameters of a state value neural network;

determining a last soft-max state value for the last observation in the path in accordance with the current values of the state value network parameters of the state value neural network; and determining the consistency error for the path based on at least the first and last soft-max state values, in addition to the combined reward and the path likelihood.

18. One or more non-transitory computer storage media storing instructions that when executed by one or more computers cause the one or more computers to perform operations for training a policy neural network used to select actions to be performed by a reinforcement learning agent interacting with an environment by performing actions from a pre-determined set of actions, the policy neural network having a plurality of policy network parameters and being configured to process an input observation characterizing a current state of the environment in accordance with the policy network parameters to generate a score distribution that includes a respective score for each action in the pre-determined set of actions, the operations comprising:

obtaining path data defining a path through the environment traversed by the agent, wherein the path is a sequence from a first observation to a last observation, and wherein the path data includes a plurality of experience tuples, wherein each experience tuple comprises a respective observation and a respective action, the observation in each experience tuple is an observation characterizing a state of the environment, and the action in each experience tuple is an action performed by the agent in response to the observation in the experience tuple;

determining a path likelihood for the path, in accordance with current values of the policy network parameters, based only on observations that are included in the path, comprising:

for each observation in a set of multiple observations comprising only observations that are included in the path:

processing the observation using the policy neural network to determine a respective score distribution in accordance with the current values of the policy network parameters; and determining a selected action score, wherein the selected action score is the action score for the action in the same experience tuple as the observation in the score distribution for the observation; and determining the path likelihood for the path using the selected action scores corresponding to the observations in the set of multiple observations comprising only observations included in the path;

determining a value update for the current values of the policy network parameters from at least the path likelihood; and using the value update to adjust the current values of the policy network parameters.

19. The non-transitory computer storage media of claim 18, wherein each experience tuple further comprises a respective reward that is a numerical value received as a result of the agent performing the action in the experience tuple, wherein determining the value update for the current values of the policy network parameters from at least the path likelihood comprises:

determining a combined reward from the rewards in the experience tuples in the path data;

determining a consistency error for the path based on at least the combined reward and the path likelihood; and determining the value update for the current values of the policy network parameters using the consistency error for the path.

20. The non-transitory computer storage media of claim 19, wherein determining the combined reward comprises determining a discounted sum of the rewards in the experience tuples in the path data.

* * * * *